Feb. 25, 1941.  G. KENDE ET AL  2,233,390
CAMERA
Filed Dec. 13, 1938   6 Sheets-Sheet 1

INVENTORS
GEORGE KENDE
PHILIP J. BROWNSCOMBE
BY
ATTORNEY

Feb. 25, 1941.　　　G. KENDE ET AL　　　2,233,390
CAMERA
Filed Dec. 13, 1938　　　6 Sheets-Sheet 3

Fig. 5.

INVENTORS
GEORGE KENDE
PHILIP J. BROWNSCOMBE
BY
ATTORNEY

Patented Feb. 25, 1941

2,233,390

UNITED STATES PATENT OFFICE 2,233,390

CAMERA

George Kende, New York, N. Y., and Philip J. Brownscombe, East Orange, N. J., assignors to Universal Camera Corporation, New York, N. Y., a corporation of Delaware Application December 13, 1938, Serial No. 245,424

27 Claims. (Cl. 95—61)

This invention relates to cameras. More particularly, our invention relates to improvements in camera constructions of the so-called "candid" type.

One of the objects of our invention is to provide an improved candid camera construction of the character described having novel combination film winding and shutter spring winding mechanism, so designed that the release button cannot be effectively operated to actuate the shutter until the film has been advanced the proper amount, and at the same time, the mechanism is so designed as to prevent overwinding.

Another object of our invention is to provide in an improved camera construction of the character described, novel means for preventing double exposures.

Still another object of our invention is to provide, in a camera construction of the character described, improved means for counting and indicating exposures.

A further object of our invention is to provide an improved camera construction of the character described having novel lens mounting and focusing means whereby the camera will at all times be in operative condition.

A still further object of our invention is to provide an improved camera construction of the character described which shall comprise relatively few and simple parts, which shall be relatively inexpensive to manufacture and easy to assemble, and which at the same time shall possess a high degree of efficiency in operation.

Other objects of this invention will in part be obvious and in part hereinafter pointed out.

Certain features shown and described but not claimed in this application are shown, described and claimed in the co-pending applications for improvements in cameras of George Kende and Philip J. Brownscombe, Serial Nos. 204,102 and 204,103, filed April 25, 1938, and Serial No. 334,204, filed May 9, 1940, and of George Kende, Serial No. 177,884, filed December 3, 1937.

The invention accordingly consists in the features of construction, combinations of elements, and arrangement of parts which will be exemplified in the construction hereinafter described, and of which the scope of application will be indicated in the claims.

In the accompanying drawings, in which is shown one of the various possible embodiments of this invention.

Referring now in detail to the drawings, it will be seen that in accordance with our invention we have provided an improved construction for the so-called "candid" type of camera, comprising a front casing part 20 and a rear casing part 21 interconnected by a suitable hinge member 22 to form a hollow box-like structure designed to house the camera parts and the mechanism for the same, soon to be described in detail.

We have provided the following novel means for metering out the film F from the take-off spool 23 and rewinding the same on the take-up spool 24 after passing the light aperture 25 in the frame 26 fixedly attached to the front casing part 20. The aperture 25 is in optical alignment with a suitable lens supported in a lens mounting 30 which will hereinafter be more fully described. The frame 26 is substantially of U-shaped cross-sectional contour and comprises a pair of parallel legs 26a and an interconnecting longitudinal portion 26b. A part of the portion 26b is longitudinally recessed to form a film track 27 designed to accommodate the film F, the aperture 25 being disposed in the same recessed part of the frame portion 26b. The frame 26 is held in position within the camera casing by means of a rigid mounting member 31 provided with pairs of projecting lugs 32 and 33. Each of the lugs 32 is attached to opposite frame legs 26a by screws 34 while the lugs 33 are attached to the frame portion 26b by the screws 35.

The pairs of lugs 32 and 33 serve to properly space the mounting member 31 with respect to the frame 26. Journaled in a part of the mounting member 31 is a shaft 38 (see Fig. 5) to which there is fixed at one end thereof a bevel gear 39, and at the other end thereof a pinion 40. The gears 39 and 40 are mounted for integral rotation with the shaft 38 and are so positioned with respect to the member 31 that axial movement of said shaft 38 is limited.

Mounted in the member 31 and projecting outwardly therefrom is a stationary shaft 41 on which is rotatably mounted on collar 42, having fixed thereto, for rotation therewith, a gear 43 so disposed as to be in mesh with the pinion 40.

Mounted in the wall of the casing part 20 is a stationary shaft 44 on which is rotatably mounted a gear 45, having in turn mounted on the hub thereof for integral rotation therewith, a second gear 46 which is so disposed as to be in mesh with the gear 43. The gear 45 is designed to be in proper meshing position with a gear 47 mounted on the removable take-up spool 25. The construction of the spool 22 may be of the type fully disclosed and described in our co-pending applications, Serial Nos. 204,102 and 204,103, filed April 25, 1938 for improvements in Cameras.

It is thus seen from the above description that when the shaft 38 is rotated, the wind-up spool 24 will be caused to rotate through the chain of gearing 40, 43, 46, 45 and 47. The gear 47 is so mounted on the spool 24 as to provide a friction slip drive connection between the said gear 47 and the spool, as disclosed in our said co-pending applications, Serial Nos. 204,102 and 204,103.

In order to conveniently rotate the shaft 38 from the outside of the camera housing for the purpose of advancing the film F, there is provided another shaft 50 (see Figs. 6 and 7) disposed at right angles to the shaft 38 and having one end thereof journaled in a part of the member 31 while the other end thereof is journaled in a plate 51 fixed to the mounting member 31 by any suitable means such as, for example, the screws 52. A portion 50a of the shaft 50 is designed to project freely through the wall of the casing part 20 to the outside of the camera, such projecting portion 50a being screw-threaded and having threadedly attached thereto a knurled winding knob 55. Mounted on that portion of the shaft 50 disposed within the camera is a combination gear member 53 having bevel teeth 53a designed to mesh with the bevel gear 39 fixed to the shaft 38.

The film F employed in connection with our invention may be of the type having a column of uniformly spaced perforations disposed adjacent one longitudinal edge thereof and in order to cause the film F to unwind from the spool 23 and to be rewound on the spool 24 after passing through the film track 27, we have provided a sprocket drive pinion 54 (see Fig. 5) fixedly mounted on the collar 42 for integral rotation therewith. It is thus seen that when the knob 55 is turned, the bevel gear 53a will cause rotation of the shaft 38 which in turn will cause rotation of the sprocket 54. The sprocket 54 is so mounted that a portion thereof projects slightly through an opening 56 in the frame portion 26b adjacent the perforations in the film and thus advances the film in a predetermined metered movement.

A spring pressed pressure plate 57 mounted in the casing part 21 serves to maintain the film F properly within the film track 27 so that it will pass closely adjacent the light aperture 25.

The film spools 23 and 24 may be suitably mounted in the camera casing such as, for example, in the manner fully disclosed in our co-pending applications, Serial Nos. 204,102 and 204,103.

The combination gear 45, 46 is so designed with respect to the sprocket 54, that the film F will be pulled or advanced a distance equal to the amount of film length required to bring fresh unexposed film into position for each new successive picture taken.

The above described gearing mechanism is also designed so that the rotative speed of the spool gear 47 is always greater than the speed actually required for the rotation of the wind-up spool 24 so as to be in step with the rate at which the sprocket 54 feeds the film toward the spool. Therefore, the spool gear 47, rotating at a faster rate than the spool 24, establishes friction between itself and the spool and thereby maintains a tension on the film between the spool 24 and the sprocket 54. This tension insures firm, uniform winding of the film on the wind-up spool 24. A pair of cradle springs 58 and 59 fixed to the casing part 20 serves to prevent the development of slack in the film as it is being unwound from the spool 23 and rewound on the spool 24.

In accordance with our invention, the above described film winding mechanism is also designed to cooperate with the shutter spring winding mechanism, so that the shutter spring will be simultaneously wound each time the film winding knob is turned. The means by which this may be accomplished will now be explained.

Figure 7:
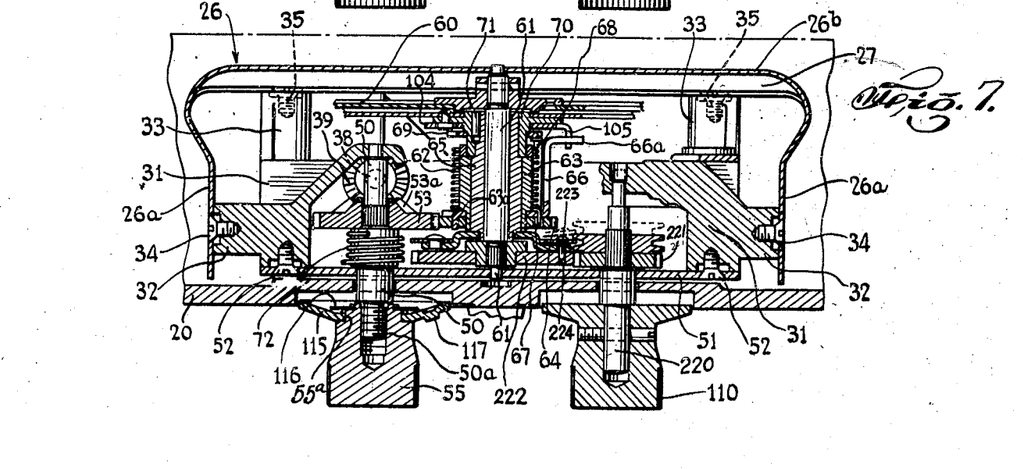
Fig. 7 is an enlarged cross-sectional view taken substantially on the line 7—7 of Fig. 1.

A shutter 60 is fixedly mounted on a shaft 61 for rotation therewith, one end of which is journaled in the plate 51, as shown in Fig. 7 of the drawings. It is noted that the axis of the shaft 61 is parallel to the axis of the shaft 50. The construction of the shutter 60, its adjustment and method of operation are fully described in the co-pending applications, Serial No. 177,884, filed December 3, 1937, and Serial No. 334,204, filed May 9, 1940, and comprises generally, a pair of overlapping plates relatively rotatably adjustable on a common axis to provide a desired shutter opening.

To cause automatic rotation of the shutter shaft 61 and shutter 60 to make an exposure, a spring 62 is wound in a predetermined direction, in this case, a counter-clockwise direction, on a hollow shaft 63, which has mounted thereon for movement therewith, a gear 64 which is in mesh with the spur teeth of the combination gear portion 53 mounted on the shaft 50. The hollow shaft 63 is fixed to the gear 64 for integral movement therewith. The shaft 63 is mounted on the shaft 65 which in turn is fixed to the shaft 61 for integral rotation therewith, for any one shutter speed setting. Fixedly attached to the gear 64 for rotation therewith is a stop arm 66 having a projecting portion 66a, the said gear 64 and stop arm 66 being fixed by a press fit up against the shoulder 63a of the hollow shaft 63. One end of the spring 62 is received and held in an opening 67 which extends through the arm 66 and the gear 64, while the other end of the said spring 62 is anchored to a lug 68 of a stop disc retainer 69. The rotatable shutter 60 is interconnected with the shaft 65 by a shutter hub 70 which is keyed to the said shaft 65 by a key 71.

From the above description it is seen that when the film winding knob 55 is turned in a clockwise direction, the gear 53 will drive the gear 64 to wind the spring 62 on the shaft 63. To prevent unwinding of the spring upon release of the knob 55, a coil spring 72 is provided which fits snugly around the shaft 50 and is interposed between the gear 53 and the plate 51. The spring 72 is wound in a counter-clockwise direction and its end nearest the plate 51 is anchored to said plate 51. The opposite end of the spring 72 is free and unattached. When the shaft 50 is rotated in a clockwise direction, the frictional rubbing action of the shaft 50 on the inside surfaces of the coils of the spring 72 loosens the spring coils slightly to ease the intensity of the spring's grip, permitting the knob 55 to turn the shaft 50 in a clockwise direction to wind the shutter spring 62 as above described. However, when an attempt is made to turn the shaft 50 in a counter-clockwise direction, the spring coils 72 immediately tighten and grip the shaft 50 firmly. Since the spring 72 has one end thereof anchored to the plate 51, rotation of the shaft 50 in a counter-clockwise direction is prevented. Thus, it is seen that when the shutter spring 62 is wound, it will stay wound until the shutter release mechanism is rendered effective. The above described mechanism is so designed that sufficient winding of the shutter spring 62 is accomplished by one complete revolution of the gear 64. The following mechanism is employed for limiting the amount of winding of the shutter spring 62 and for releasing the shutter 60 for effective action.

Figure 9:
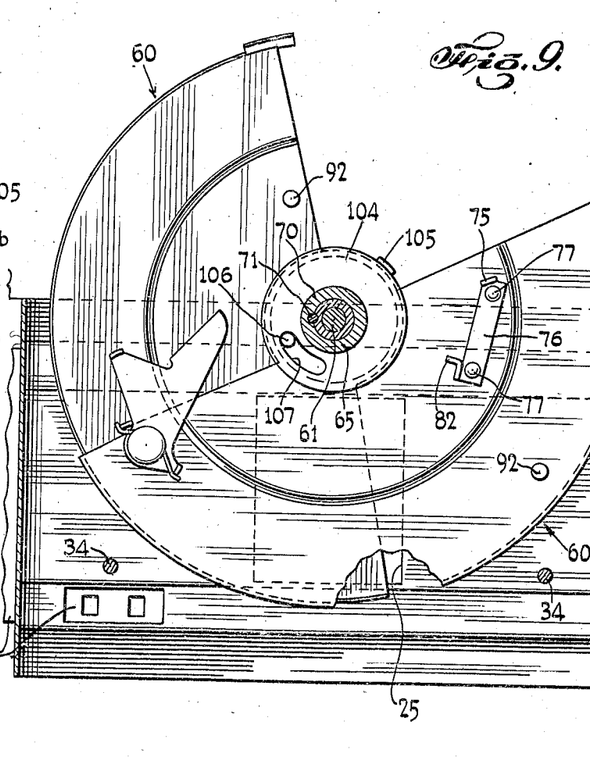
Fig. 9 is a cross-sectional view taken substantially on the line 9—9 of Fig. 8.
Figures 10, 11, 12, 13:
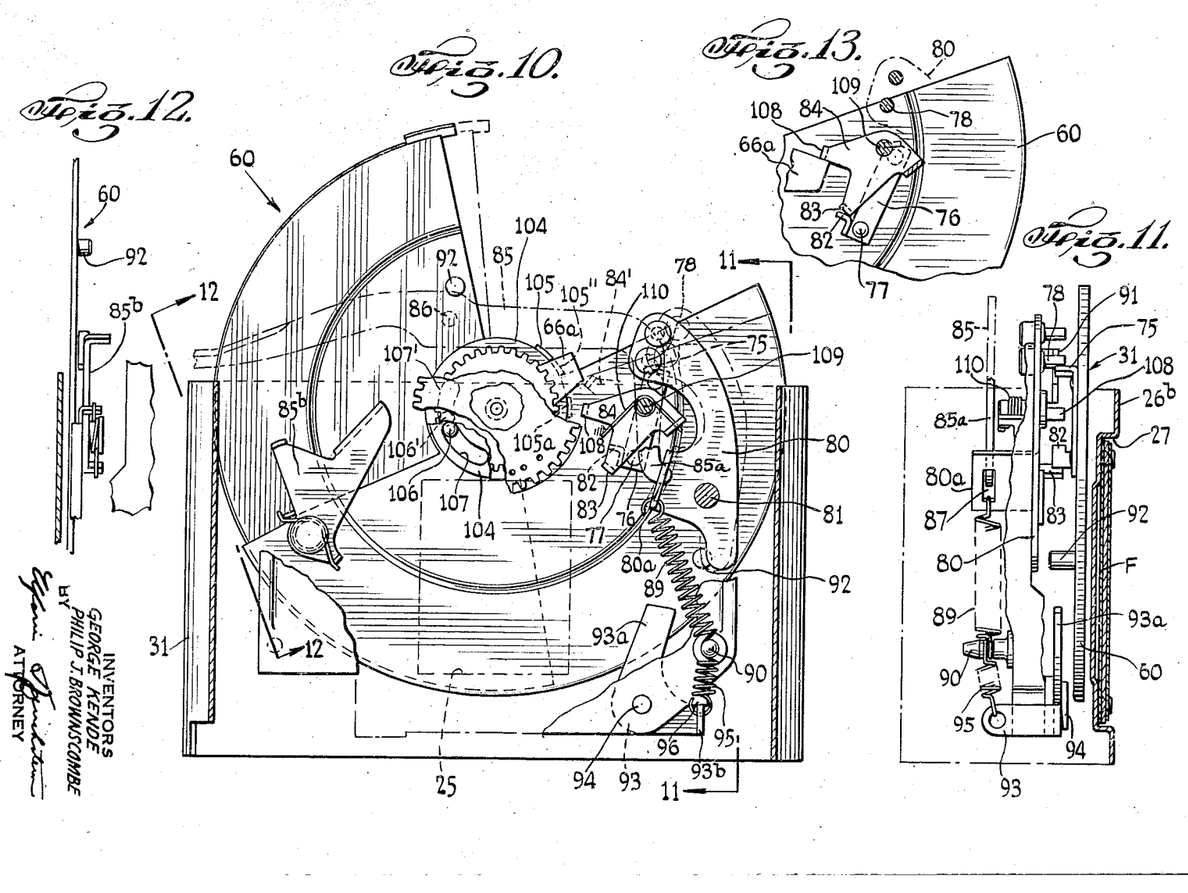
Fig. 10 is a view similar to Fig. 9 but with additional mechanism illustrating the operation of the shutter.
Fig. 11 is a cross-sectional view taken substantially on the line 11—11 of Fig. 10.
Fig. 12 is a cross-sectional view taken substantially on the line 12—12 of Fig. 10.
Fig. 13 is a fragmentary view of the mechanism shown in Fig. 10, but illustrating a different stage in the operation thereof.

The stop disc retainer 69 to which one end of the shutter spring 62 is anchored does not move during the winding operation of the spring 62 because it is fixed to the shutter 60 by means of the member 70, and because the shutter is held against rotation by the following means. In Figs. 10, 11 and 12, the mechanism is shown in relation to the shutter in the position immediately before the exposure is to be made and after the spring 62 has been wound. The shutter 60 is normally prevented from movement in a counter-clockwise direction (the direction in which the shutter spring 62 is designed to rotate the shutter) because of a projecting portion 75 of a stop plate 76 being in contactive engagement with a release lever pin 78 fixed to a release lever 80, which is pivotally mounted on the mounting member 31 by the pivot 81. The plate 76 is rigidly fixed to the shutter 60 (see Fig. 9) by any suitable means, such as for example, by the rivets 77.

The shutter 60 is also prevented from clockwise movement because of a projection 82 on the fixed stop plate 76 which is designed to come in contact with a bent down projecting portion 83 of a pivoted stop link 84.

The operation of the mechanism for making an exposure of the properly positioned film is as follows: A rocker arm 85 is provided which is freely rotatably mounted on a stationary shaft 86 fixedly held in position between the member 31 and the plate 51 (see Fig. 6). The rocker arm 85 is provided at one end thereof with an angular portion 85a, the extreme tip of which is projectingly received in a slot 87 formed in a projecting portion 80a of the release lever 80 (see Fig. 11). When the rocker arm 85 is rotated about the pivot 86 in a counter-clockwise direction by pressing downwardly on the portion 85b (see Fig. 5) of the said rocker arm, the projecting portion 85a will abut the wall of the slot 87 to cause the release lever 80 to rotate in a clockwise direction about the pivot 81, against the action of a spring 89. One end of the spring 89 is fixed to a stationary pin 90 mounted on the member 31, while the other end thereof is fastened to the release lever portion 80a, in the slot 87 as shown in Figs. 10 and 11. The spring 89 thus normally urges the release lever 80 to turn in a counter-clockwise direction. The clockwise rotational movement of the release lever 80 is limited by the pin 78 striking an abutment 91 on the member 31. The pin 78 being rigidly fixed to the release lever 80 will be moved out of the path of the projection 75 on the plate 76, as shown by the dotted line position of the lever 80 in Fig. 10. The shutter spring 62, being in wound condition, will then automatically cause the shutter 60 to rotate in a counter-clockwise direction to expose the film.

When the shutter 60 has made a trifle less than one complete revolution, a ratchet pin 92 rigidly attached to the shutter 60 is so positioned that it will come in contact with a projecting portion 93a of the pawl member 93 which is rotatably mounted about the pivot 94 fixed to the member 31. The pawl 93 will then be caused to rotate in a clockwise direction against the action of the spring 95 arranged to normally urge the pawl to rotate in a counterclockwise direction. One end of the spring 95 may be fixed to the pin 90, while the other end of the spring is attached to a projecting portion 93b of the pawl 93. Upon further rotation of the shutter 60, the pin 92 will move out of contactive engagement with the pawl 93 which will again be brought back to its normal position by the spring 95. The counter-clockwise rotational movement of the pawl 93 is limited by an abutment portion 96 on the member 31, cooperating with the pawl portion 93b. The shutter 60 continues to rotate until the projection 82 on the plate 76 comes into contact with the projection 83 on the stop link 84, at which time the position of the parts are as shown in Fig. 13 of the drawings.

In this position, the shutter is prevented from rotational movement in one direction because the ratchet pin 92 will strike the pawl 93 and which, due to the abutting action of the portions 96 and 93b cannot move out of the path of the pin 92.

It is thus seen from the above description that movement of the shutter 60 is prevented both before and after exposure.

Figure 5:
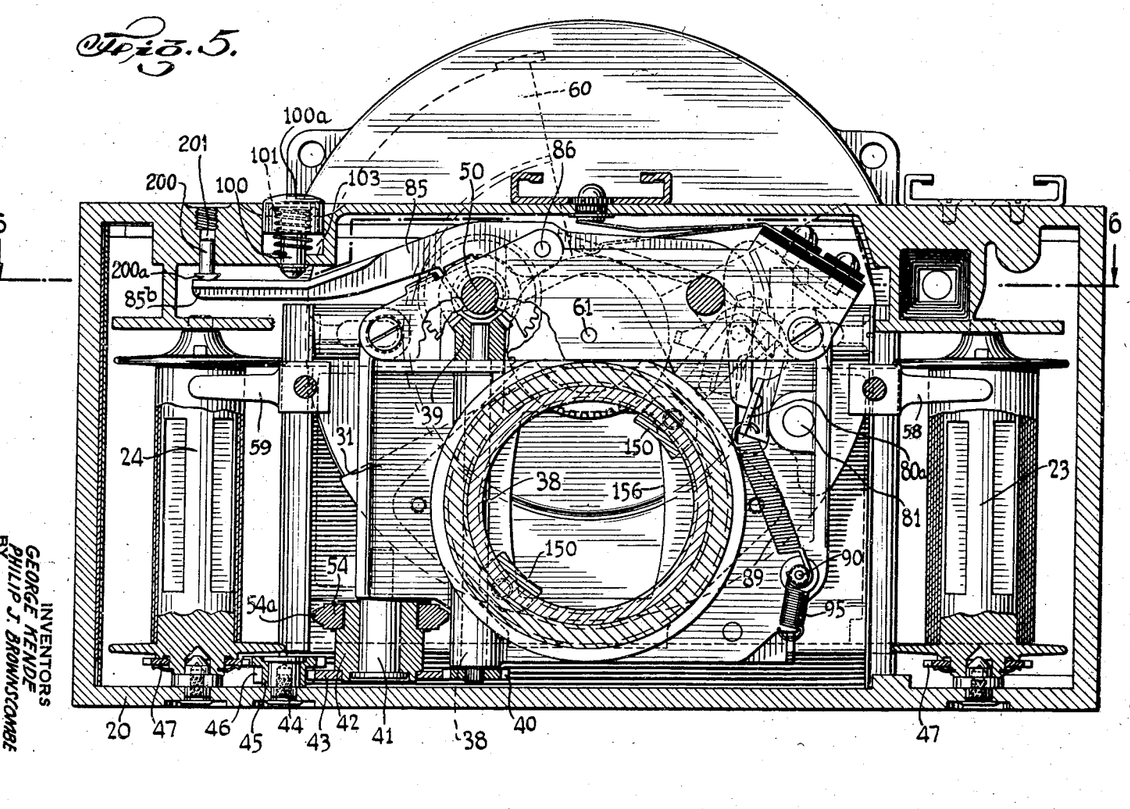
Fig. 5 is an enlarged cross-sectional view taken substantially on the line 5—5 of Fig. 2.

The rocker arm 85 is designed to be operated from the outside of the camera by means of a push button 100 mounted in the casing part 20 for axial movement, and normally held out of contact with the rocker arm portion 85b by means of a spring 101 housed in the opening 103 and having one end thereof abutting the bottom wall of the opening 103 and the other end thereof pressing up against the head 100a of the button 100, as shown in Fig. 5.

A plunger 200 operating in an opening 201 in the camera casing part 20 is provided for causing movement of the rocker arm 85 by the attachment of any suitable air compression tube. The lower enlarged end 200a of the plunger 200 is adapted to rest upon the rocker arm portion 85b. The upper portion of the opening is screw threaded to receive a correspondingly threaded portion of the compression tube device.

In accordance with our invention, we have thus provided novel means for preventing double exposure, for the following reasons.

When the push button 100 is released, after having rotated the rocker arm 85 in a counter-clockwise direction as above described, the rocker arm 85 and the release lever 80 return to their original position. If the push button 100 is again pushed down to remove the rocker arm 85, the shutter 60 will be prevented from rotating in the direction which the spring 62 normally tends to rotate it, because the projection 82 will be in abutting relationship with the projection 83 on the stop link 84.

In order to place the camera in operative condition for taking a second exposure after the first exposure has been made as above described, the mechanism is so designed that the shutter spring 62 must first be wound, as will now be explained.

The knob 55 is turned in a clockwise direction to wind the shutter spring 62, and to simultaneously advance the film to the next frame, as hereinbefore described. A stop disc 104 having a projecting portion 105 is freely mounted on the member 70 and is provided with a slot 107. (See Figs. 9 and 10.) Engaging with the slot 107 is a pin 106 mounted in the shutter hub 70. The stop disc 104 can thus rotate freely with respect to the shutter 60 but is limited in movement by the pin 106 and the slot 107. It is noted that before the exposure is made, the stop arm portion 66a is in actual or approximate contact with the projection 105 of the disc 104, one end of the slot 107 being in contact with the pin 106 as in Figs. 9 and 10. After the exposure has been made, the projection 105 will be in contact with the stop arm 66a as shown by the dotted line position 105' of the projection 105. The slot 107 and pin 106 will then be in the dotted line positions 107' and 106' respectively.

When the knob 55 is turned to drive the gear 64, the stop arm 66, being rigidly attached to the said gear 64, will rotate with it. When the stop arm 66 has been caused to make almost one complete revolution in a counter-clockwise direction, it will come into contact with the projection 108 of the stop link 84, as in Fig. 13, and upon continued rotation of the stop arm 66, will thereby cause rotational movement of the link 84 about its pivot 109 fixed to the member 31 in a clockwise direction to take up a position 84' shown in dotted lines. When the link 84 is moved to its position 84', the projection 83 will be moved out of the path of the projection 82 on the plate 76. The shutter 60 will then be free to rotate in a counter-clockwise direction. However, the shutter 60 is still prevented from such rotational movement by the abutting relationship of the projection 75 and the release lever pin 78. It is also seen that the stop arm portion 66a will then come into contactive engagement with the projection 105 of the stop disc 104 and will have moved the projection 105 to the position 105" shown in dotted lines. Upon continued rotation of the knob 55, the projection 108 loses contact with the arm 66a and the stop link 84 rotates back to its original position about the pivot 109 due to the action of the spring 110. The counter-clockwise rotational movement of the link 84 is limited by an abutting portion of the member 31.

A slightly further rotational movement of the arm portion 66a will bring it back to its original position against the projection 105 of the stop disc 104. It is noted that in this last named position, one end of the slot 107 will contact the pin 106 to prevent further rotational movement of the stop disc 104. Since, as previously explained, the shutter 60 is held against rotation by the pin 78 and projection 75, the arm 66 cannot be rotated any further in a counter-clockwise direction, which means that the wind knob 55 cannot be turned any further, until another exposure has been made. It is also seen that by the above described construction, it is not possible to wind for more than the correct length of film required for each exposure, and thereby cutting in half of pictures is prevented and at the same time, a saving of film is effected.

While the above description relates to the operation of the camera for taking instantaneous shots, it is understood that the mechanism hereinbefore described may also be suitably used in connection with the taking of bulb or time exposures, as described and disclosed in our copending application, Serial No. 334,204, filed May 9, 1940.

Also, the mechanism employed for adjusting the shutter speeds or shutter opening through a knob 110 rotatably mounted in the casing part 20 is fully described and disclosed in our said copending application, Serial No. 334,204, filed May 9, 1940.

It is also noted that in accordance with our invention, the shutter speed adjusting mechanism is interrelated with the shutter wind and shutter actuating mechanism. Thus, it is clearly shown in Figs. 6 and 7 of the drawings where it is noted that the shutter speed knob 110 is fixed to a shaft 220 for rotation therewith. The shaft 220 is journaled in the member 31 and the plate 51. Mounted on the shaft 220 for rotation therewith is a gear 221 meshing with a gear 222 fixed to the shutter shaft 61. The mechanism is so designed that the knob 110 is normally held against rotation by a resiliently mounted pin 223 received in an opening 224 in the gear 222. When the knob is pressed inwardly, however, the pin 223 is withdrawn from the opening 224 and the gear 221 is permitted to drive the gear 222 which causes relative rotation between the two plates of the shutter 60 to adjust the size of the opening, as more fully described and shown in our said co-pending application, Serial No. 334,204, filed May 9, 1940.

In accordance with our invention, the following mechanism, in cooperation with the film and shutter wind knob 55, is provided for counting and indicating the number of exposures taken.

Figure 1:
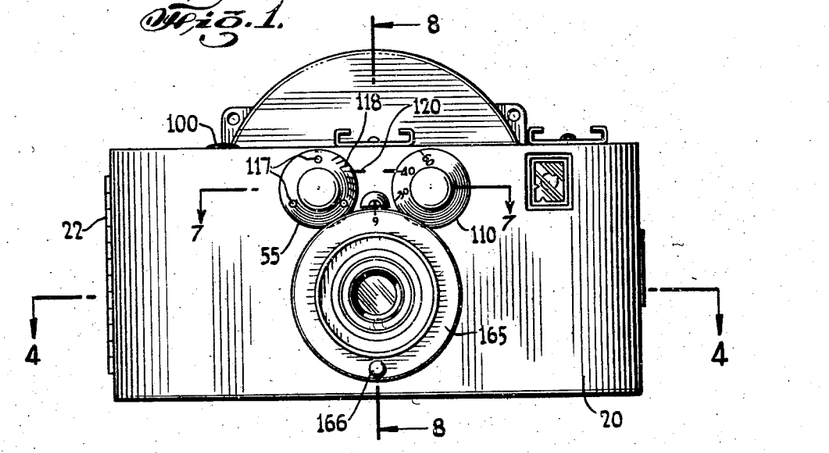
Fig. 1 is a front elevational view of a camera constructed in accordance with this invention.
Figure 2:
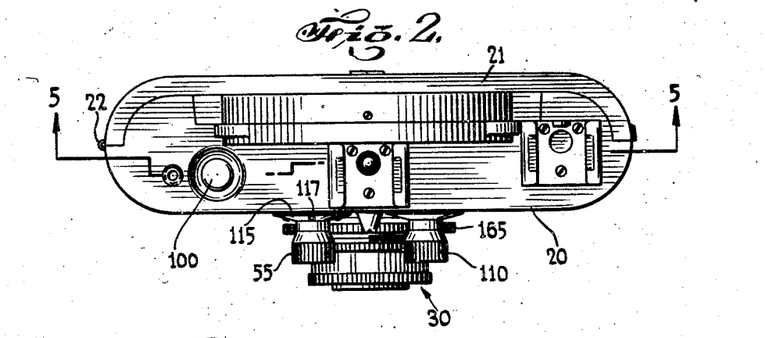
Fig. 2 is a top plan view thereof.
Figure 3:
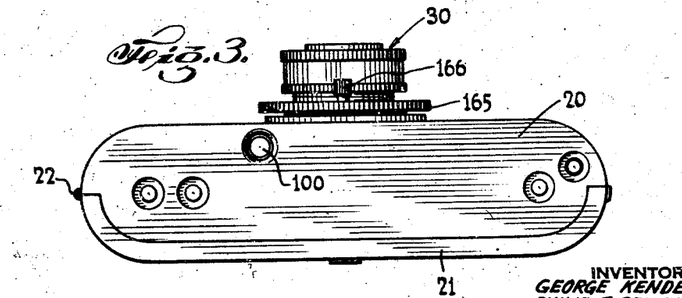
Fig. 3 is a bottom plan view thereof.
Figure 6:
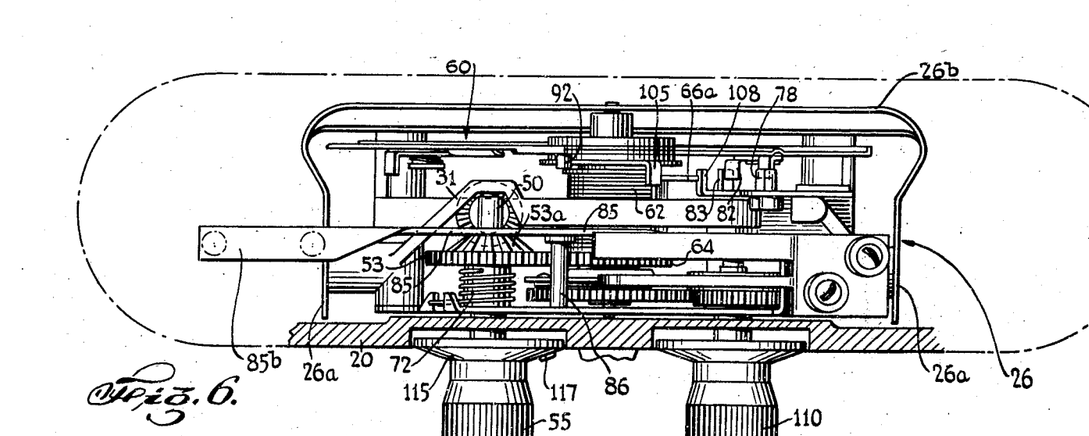
Fig. 6 is a cross-sectional view taken substantially on the line 6—6 of Fig. 5.

Referring particularly to Figs. 6 and 7 of the drawings, it is noted that the knob 55 is provided with a flanged portion 115 which is freely received on a portion of the knob 55 and is held by a spring 116 in resilient frictional engagement up against a shoulder 55a of the knob 55. The spring 116 is fixed to the knob 55. The construction of the spring 116 is such that sufficient friction is provided to insure simultaneous rotation of the flange 115 with the knob 55. However, the flange 115 may also be turned independently of the knob 42, by exerting enough force to overcome the friction of the spring 116. To facilitate the independent turning of the flange 115, there is provided a plurality of circumferentially disposed projections 117 on the outer surface of the flange 115. The outer surface of the flange is designed to serve as a counting dial, and is divided adjacent its periphery into a predetermined number of divisions, in this case, 36 equal spaces which are identified by a short line mark 118 adjacent the periphery (see Fig. 1). While, as hereinbefore described, the gear 64 makes one complete revolution each time the shutter spring 62 is wound, the combination gear 53 is so designed as not to make a complete revolution. This is accomplished by providing the gear 64 with 35 teeth and the gear portion 53 with 36 teeth. Thus for each complete revolution of the gear 65, the gear 53 makes 35/36 of a revolution. It will therefore be apparent that 1/36 of a revolution is lost by the gear 53 and consequently by the counting dial 115 each time the gear 53, activated through the knob 55, turns through 35/36 of a revolution. Therefore, with each subsequent winding of the spring 62, the dial 115 stops 1/36 of a revolution (or one space 118 on the dial) short of the point it stopped at after completion of the previous winding. A fixed mark 120 is provided on the camera casing so that markings 118 on the dial 115 will progressively align themselves one after the other with the fixed mark 120.

The camera operator after loading the camera with film, first frictionally, with the aid of the pins 117, moves the dial 115 until the zero marking thereon is in register with the fixed mark 120 on the casing. He is then kept informed as to how many pictures have been taken without peering through a colored glass at the back of the camera. Also by the above described construction, markings on the film necessary for cooperation with a colored window may be dispensed with.

Figure 4:
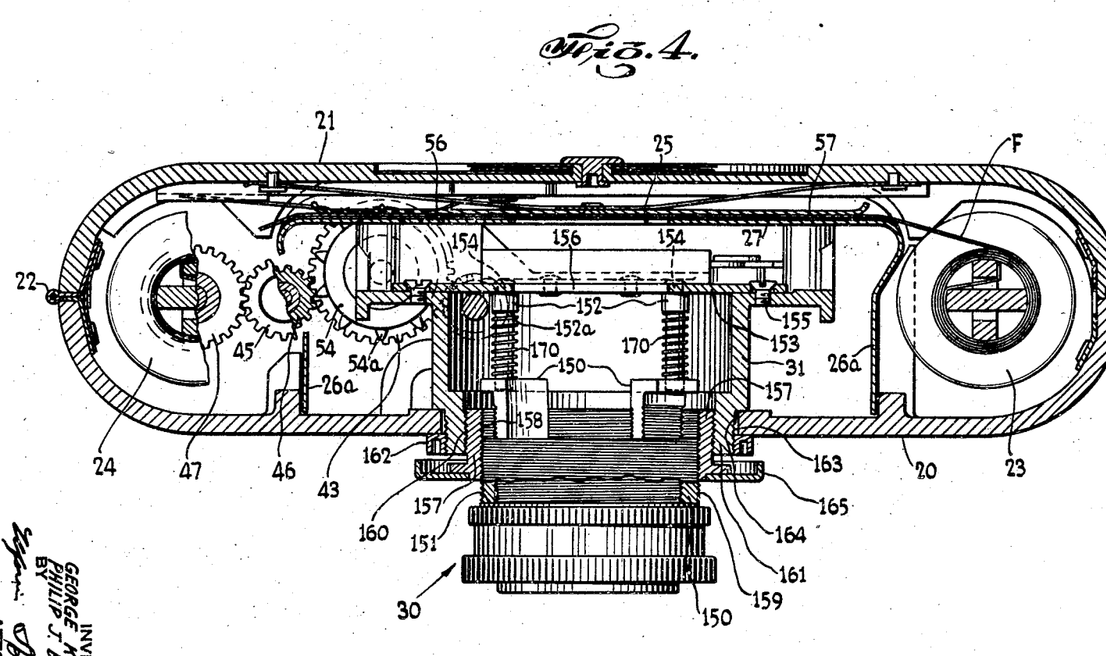
Fig. 4 is an enlarged cross-sectional view taken substantially on the line 4—4 of Fig. 1.
Figure 8:
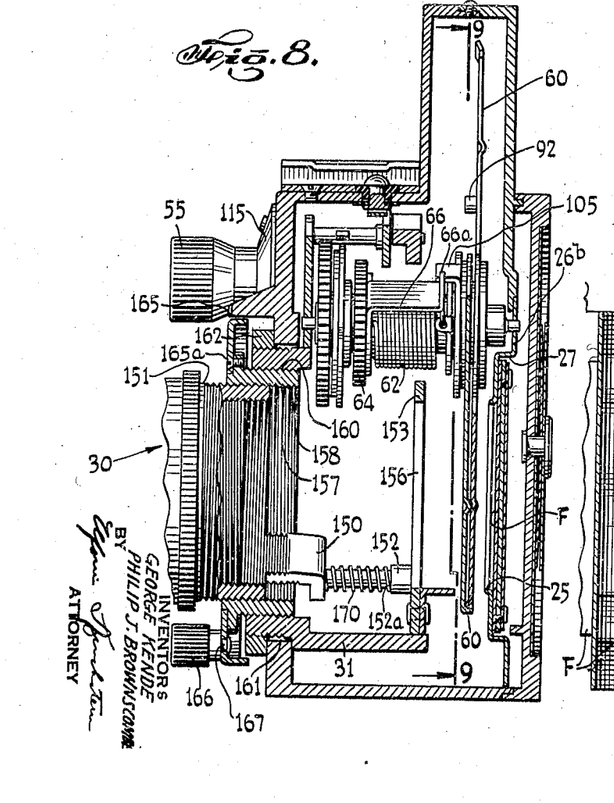
Fig. 8 is an enlarged cross-sectional view taken substantially on the line 8—8 of Fig. 1.

In accordance with our invention the following novel lens mounting assembly has been provided. Referring particularly to Figs. 4 and 8 of the drawings, it is seen that the lens assembly 30 is screwed tightly into an inner sleeve 150 to rest up against the shoulder 151. Holes in the two projections of the sleeve 150 provide running fits for the inner sleeve posts 152 on which the inner sleeve 150 rides and which is movable into and out of the camera in an axial direction, while at the same time being held against axial rotation. The sleeve posts 152 are permanently fixed to a mask plate 153 by the rivets 154, the said plate 153 being in turn rigidly fastened to the mounting member 31 by the screws 155. The mounting member 31 is firmly fixed to the camera casing part 20 by a screw threaded clamp ring 162 cooperating with a threaded portion 163 of the member 31, projecting through an opening 164 in the casing part 20. The mask plate 153 is provided with an opening 156 in proper optical register with the light opening 25 in the frame 26.

A middle sleeve 157 is provided which has a screw thread 158 cut on the inside diameter thereof meshing with the outside thread 159 of the inner sleeve 150, and a screw thread 160 cut on its outside diameter which meshes with the thread cut in the inside diameter of the circular threaded portion 161 of the member 31.

While a satisfactory construction has been made in which the threads 158 and 160 of the middle sleeve 157 have the same pitch, it is understood that they may be of different pitch. However, whereas thread 160 is a double lead thread cut right hand, the thread 158 is a quadruple lead thread cut left hand.

A focusing ring 165 is fixedly attached to the middle sleeve 157 by any suitable attaching means such as, for example, flat head screws 165a (see Fig. 8). To facilitate the operation of the focusing ring 165, a knob 166 is permanently fastened thereto by any suitable means, such as the rivet 167.

It is thus seen from the above description that when the focusing ring 165 is rotated in a counter-clockwise direction, the middle sleeve 157 will move in an axial direction out of the camera, and the inner sleeve 150 will also move in the same direction along with the lens assembly 30 which is fixed to the inner sleeve 150. Because of the fact that the thread 160 has a double lead, and the thread 158 has a quadruple lead, the middle sleeve 157 when traveling one unit of distance will cause the inner sleeve 150, along with the lens assembly 30, to correspondingly travel two units of distance relative to the middle sleeve 157. Therefore, relative to the camera body, the lens assembly 30 has at the same time traveled three units of distance.

The above described mechanism is so designed that if the focusing ring 165 is turned one complete revolution in a counter-clockwise direction, the middle sleeve 157 will travel in an outward direction with respect to the camera a distance of 1/16 inch, and the inner sleeve 150, along with the lens assembly 30 will move in the same direction twice the distance of the movement of the middle sleeve 157 or a distance of 1/8 inch. The total distance which the lens assembly 30 would travel outwardly with respect to the camera casing would then be the distance of travel of the middle sleeve 157 plus the distance of travel of the inner sleeve 150, or 3/16 inch.

In other words, the travel of the lens assembly 30 with respect to the camera body is the result of adding the travel of the middle sleeve 157 with respect to the camera body to the travel of the inner sleeve 150 relative to the middle sleeve 157. Thus, by our construction, two additive movements of thread systems are accomplished by the turning of a single member.

This ratio of movement between the middle sleeve 157 and the inner sleeve 150 will always be constant irrespective of the direction of rotational movement of the focusing ring 165.

Coil springs 170 encircling the posts 152 and interposed between a shoulder 152a of the posts 153 and the inner sleeve 150 serve to maintain a good rubbing contact between all the threads in the above described assembly. Thus, no slack or objectionable play can develop in the threaded joints, and accuracy of focus of the lens is thereby assured.

The outer surface of the focusing ring 165 may be provided with suitable markings to indicate desired focal settings, designed to cooperate with a stationary line mark on the camera casing.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described our invention, we claim as new and desire to secure by Letters Patent:

1. In a camera of the character described adapted for use with a continuous strip of perforated film, the combination of a casing, a shaft journaled in said casing, a shutter rotatable with said shaft, a windable spring for actuating said shutter to cause an exposure of said film, said spring being concentric with and surrounding said shaft means for advancing said film after each exposure, said advancing means comprising a sprocket member having teeth adapted to be engaged in said film perforations, means actuated by said film advancing means to wind said shutter spring, and means for normally rendering said shutter spring ineffective after each exposure, and to remain ineffective until said film advancing means is fully actuated.

2. In a camera of the character described adapted for use with a continuous strip of film, the combination of a casing, a first shaft journaled in said casing, a shutter mounted on said first shaft for rotation therewith, a hollow shaft surrounding said first shaft and rotatable relatively thereto, a spring having one end thereof fixed for rotation with said shutter and having the other end thereof fixed for rotation with said hollow shaft, said spring when in wound condition being adapted to actuate said shutter, means for winding said spring, said winding means comprising a gear on said hollow shaft, and means for causing rotation of said gear.

3. In a camera of the character described adapted for use with a continuous strip of film, the combination of a casing, a first shaft journaled in said casing, a shutter mounted on said first shaft for rotation therewith, said shutter comprising a pair of members adapted normally to rotate as a unit, a hollow shaft surrounding said first shaft and rotatable relatively thereto, a spring having one end thereof fixed for rotation with said shutter and the other end thereof fixed for rotation with said hollow shaft, said spring when in wound condition being adapted to actuate said shutter, means for winding said spring, said winding means comprising a gear on said hollow shaft, means for causing rotation of said gear, a second gear mounted for rotation with said first shaft, and means cooperating with said second gear for relatively rotating said shutter members to form a space therebetween adapted to serve as a shutter opening, said hollow shaft, said spring, said first gear and said second gear being concentric with said first shaft.

4. In a camera of the character described adapted for use with a continuous strip of film, the combination of a casing, a first shaft journaled in said casing, a shutter mounted for rotational movement with said first shaft, said shutter comprising a pair of members adapted normally to rotate as a unit, a second shaft concentric with and surrounding said first shaft, said second shaft being rotatable relatively to said first shaft, a spring having one end thereof fixed for rotation with one of said shutter members and the other end thereof fixed to said second shaft, said spring when in wound condition being adapted to actuate said shutter to rotate in one direction, means for winding said spring, said winding means comprising a gear on said second shaft, manually rotatable means disposed outside of said casing for causing rotation of said second shaft gear, a gear mounted on said first shaft, and means including a third gear in mesh with said first shaft gear for relatively rotating said shutter members to form a space therebetween adapted to serve as a shutter opening.

5. In a camera of the character described adapted for use with a continuous strip of perforated film, the combination of a casing, a shaft mounted in said casing, a rotatable shutter mounted on said shaft, a windable spring for causing rotational movement of said shutter, and means for simultaneously advancing said film a predetermined amount and winding said shutter spring, said last named means comprising a gear rotatable relatively to said shutter shaft, said gear and said spring being concentric with and surrounding said shutter shaft.

6. In a camera of the character described adapted for use with a continuous strip of perforated film, the combination of a casing, a first shaft journaled in said casing, a shutter mounted for rotation with said first shaft, a hollow shaft surrounding said first shaft and rotatable relatively thereto, a windable spring for causing rotational movement of said shutter, and means for simultaneously advancing said film a predetermined amount and winding said shutter spring, said last named means comprising a gear on said hollow shaft, said spring being concentric with and surrounding said hollow shaft and said first shaft.

7. In a camera of the character described adapted for use with a continuous strip of perforated film, the combination of a casing, a shaft mounted in said casing, a rotatable shutter mounted on said shaft, a windable spring for causing rotational movement of said shutter, means for simultaneously advancing said film a predetermined amount and winding said shutter spring, said last named means comprising a gear on said shutter shaft, a second shaft mounted in said casing, a gear mounted on said second shaft in mesh with said shutter shaft gear, manually operatable means disposed outside of said casing for causing rotation of said second shaft, and means for permitting rotational movement of said second shaft in one direction only to cause winding of said shutter spring in one direction only.

8. In a camera of the character described adapted for use with a continuous strip of perforated film, the combination of a casing, a shaft mounted in said casing, a rotatable shutter mounted on said shaft, a windable spring for causing rotational movement of said shutter, means for simultaneously advancing said film a predetermined amount and winding said shutter spring, said last named means comprising a gear on said shutter shaft, a second shaft mounted in said casing, a gear mounted on said second shaft in mesh with said shutter shaft gear, manually operatable means disposed outside of said casing for causing rotation of said second shaft, and means for permitting rotational movement of said second shaft in one direction only to cause winding of said shutter spring in one direction only, said last named means comprising a coil spring surrounding said second shaft.

9. In a camera of the character described adapted for use with a continuous strip of perforated film, the combination of a casing, a shaft mounted in said casing, a rotatable shutter mounted on said shaft, a windable spring for causing rotational movement of said shutter, means for simultaneously advancing said film a predetermined amount and winding said shutter spring, said last named means comprising a gear on said shutter shaft, a second shaft mounted in said casing, a second gear mounted on said second shaft in mesh with said shutter shaft gear, manually operatable means disposed outside of said casing for causing rotation of said second shaft, and means for permitting rotational movement of said second shaft in one direction only to cause winding of said shutter spring in one direction only, said last named means comprising a coil spring surrounding said second shaft, said coil spring being interposed between said second gear and said casing.

10. In a camera of the character described adapted for use with a continuous strip of perforated film, the combination of a casing, a shaft mounted in said casing, a rotatable shutter mounted on said shaft, a windable spring for causing rotational movement of said shutter, means for simultaneously advancing said film a predetermined amount and winding said shutter spring, said last named means comprising a gear on said shutter shaft, a second shaft mounted in said casing, a second gear mounted on said second shaft in mesh with said shutter shaft gear, manually operatable means disposed outside of said casing for causing rotation of said second shaft, and means for permitting rotational movement of said second shift in one direction only to cause winding of said shutter spring in one direction only, said last named means comprising a coil spring surrounding said second shaft, one end of said coil spring being fixed to said casing and the other end of said coil spring being free and unattached.

11. In a camera of the character described adapted for use with a continuous strip of perforated film, the combination of a casing, a shaft mounted in said casing, a rotatable shutter mounted on said shaft, a windable spring for causing rotational movement of said shutter, means for simultaneously advancing said film a predetermined amount and winding said shutter spring, said last named means comprising a gear on said shutter shaft, a second shaft mounted in said casing, a combination gear fixed to said second shaft for rotation therewith, said combination gear having a spur teeth portion meshing with said shutter shaft gear, and a bevel teeth portion, a third shaft mounted on said casing, and a bevel gear fixed to said third shaft, in mesh with said combination gear bevel teeth.

12. In a camera of the character described adapted for use with a continuous strip of perforated film, the combination of a casing, a shaft mounted in said casing, a rotatable shutter mounted on said shaft, a windable spring for causing rotational movement of said shutter, means for simultaneously advancing said film a predetermined amount and winding said shutter spring, said last named means comprising a gear on said shutter shaft, a second shaft mounted in said casing, a combination gear fixed to said second shaft for rotation therewith, said combination gear having a sput teeth portion meshing with said shutter shaft gear, and a bevel teeth portion, a third shaft mounted in said casing, and a bevel gear fixed to said third shaft in mesh with said combination gear bevel teeth, said third shaft having mounted thereon for rotation therewith a pinion adapted to drive a sprocket wheel having teeth engaging in the perforations of said film to advance the same.

13. In a camera of the character described adapted for use with a continuous strip of perforated film, the combination of a casing, a shaft mounted in said casing, a rotatable shutter mounted on said shaft, a windable spring for causing rotational movement of said shutter, means for simultaneously advancing said film a predetermined amount and winding said shutter spring, said last named means comprising a gear on said shutter shaft, a second shaft mounted in said casing, a combination gear fixed to said second shaft for rotation therewith, said combination gear having a spur teeth portion meshing with said shutter shaft gear, and a bevel teeth portion, a third shaft mounted in said casing, a bevel gear fixed to said third shaft in mesh with said combination gear bevel teeth, said third shaft having mounted thereon for rotation therewith a pinion adapted to drive a sprocket wheel having teeth engaging in the perforations of said film to advance the same, and manual manipulatable means disposed outside of said casing for causing rotation of said second shaft.

14. In a camera of the character described adapted for use with a continuous strip of perforated film, the combination of a casing, a shaft mounted in said casing, a rotatable shutter mounted on said shaft, a windable spring for causing rotational movement of said shutter, means for simultaneously advancing said film a predetermined amount and winding said shutter spring, said last named means comprising a gear on said shutter shaft, a second shaft mounted in said casing, a combination gear fixed to said second shaft for rotation therewith, said combination gear having a spur teeth portion meshing with said shutter shaft gear, and a bevel teeth portion, a third shaft mounted in said casing, a bevel gear fixed to said third shaft in mesh with said combination gear bevel teeth, said third shaft having mounted thereon for rotation therewith a pinion adapted to drive a sprocket wheel having teeth engaging in the perforations of said film to advance the same, and means for permitting rotation of said second shaft in one direction only.

15. In a camera of the character described adapted for use with a continuous strip of perforated film, the combination of a casing, a shaft mounted in said casing, a rotatable shutter mounted on said shaft, a windable spring for causing rotational movement of said shutter, means for simultaneously advancing said film a predetermined amount and winding said shutter spring, said last named means comprising a gear on said shutter shaft, a second shaft mounted in said casing, a combination gear fixed to said second shaft for rotation therewith, said combination gear having a spur teeth portion meshing with said shutter shaft gear, and a bevel teeth portion, a third shaft mounted in said casing, a bevel gear fixed to said third shaft in mesh with said combination gear bevel teeth, said third shaft having mounted thereon for rotation therewith a pinion adapted to drive a sprocket wheel having teeth engaging in the perforations of said film to advance the same, and means for permitting rotation of said second shaft in one direction only, said last named means comprising a coil spring encircling said second shaft.

16. In a camera of the character described adapted for use with a continuous strip of film, the combination of a casing, a shaft mounted in said casing, a rotatable shutter on said shaft, a gear on said shaft, a windable spring adapted when in wound condition to cause rotation movement of said shutter, means for simultaneously causing said film to be advanced a predetermined distance and said shutter spring to be wound, said last named means comprising means for automatically counting and successively indicating the number of times said film has been advanced, said counting and indicating means comprising a second shaft mounted in said casing, a gear on said second shaft in mesh with said shutter shaft gear, said second shaft gear having one tooth more than said shutter shaft gear, whereby for each complete revolution of said shutter shaft gear the said second shaft gear will make slightly less than one complete revolution, an indicating dial mounted on said second shaft for rotation therewith, and means for frictionally rotating said dial with respect to said shaft, whereby to set the said dial back to a starting point when a new supply of film is placed in the camera.

17. In a camera of the character described adapted for use with a continuous strip of film, the combination of a casing, a first shaft journaled in said casing, a shutter mounted for rotation with said first shaft, a second shaft concentric with and surrounding said first shaft, a spring having one end thereof fixed for rotation with said shutter and having the other end thereof fixed to said second shaft, said spring when in wound condition being adapted to actuate said shutter, means for winding said spring, said winding means comprising a gear on said second shaft, an arm fixed to said gear for rotation therewith, and means for causing rotation of said gear, said arm having a portion thereof disposed in the path of abutment to limit the rotation of said gear.

18. In a camera of the character described adapted for use with a continuous strip of perforated film, a casing, a frame mounted within said casing, said frame comprising a light aperture and a film passageway surrounding said aperture, means comprising a rigid one-piece mounting member for holding said frame in position within said casing, said mounting member having a tubular portion in optical alignment with said light aperture, a shaft journaled in said mounting member, the axis of said shaft being at right angles to the optical axis, a spur gear fixedly mounted at one end of said shaft, and a bevel gear fixedly mounted at the other end of said shaft, said gears being so arranged with respect to said mounting member as to limit the axial movement of said shaft.

19. In a camera of the character described adapted for use with a continuous strip of perforated film, a casing, a frame mounted within said casing, said frame comprising a light aperture and a film passageway surrounding said aperture, means comprising a rigid one-piece mounting member for holding said frame in position within said casing, said mounting member having a tubular portion in optical alignment with said light aperture, a shaft journaled in said mounting member, the axis of said shaft being at right angles to the optical axis, a spur gear fixedly mounted at one end of said shaft, a bevel gear fixedly mounted at the other end of said shaft, said gears being so arranged with respect to said mounting member as to limit the axial movement of said shaft, and means for causing said film to be advanced through said passageway, said last named means comprising a second shaft rotatably supported by said mounting member, a bevel gear on said second shaft in mesh with said first shaft bevel gear.

20. In a camera of the character described adapted for use with a continuous strip of perforated film, a casing, a frame mounted within said casing, said frame comprising a light aperture and a film passageway surrounding said aperture, means comprising a rigid one-piece mounting member for holding said frame in position within said casing, said mounting member having a tubular portion in optical alignment with said light aperture, a shaft journaled in said mounting member, the axis of said shaft being at right angles to the optical axis, a spur gear fixedly mounted at one end of said shaft, a bevel gear fixedly mounted at the other end of said shaft, said gears being so arranged with respect to said mounting member as to limit the axial movement of said shaft, means for causing said film to be advanced through said passageway, said last named means comprising a second shaft rotatably supported by said mounting member, a bevel gear on said second shaft in mesh with said first shaft bevel gear, and a sprocket wheel rotatably supported by said mounting member and adapted to be driven by said first shaft spur gear, whereby the sprocket wheel teeth engaging in the film perforations cause said film to be advanced.

21. In a camera of the character described adapted for use with a strip of film, the combination of a casing, a shaft supported in said casing, a rotatable shutter mounted on said shaft, a windable spring for causing the rotation of said shutter in one direction only, a gear mounted on said shaft for rotation therewith, a stop arm fixed to said gear to limit the rotation thereof, one end of said spring being fixedly attached for integral movement with said shaft and the other end of said spring being fixed to said shutter, means for advancing the film, said film advancing means comprising a second gear meshing with said first gear to cause rotation of said shaft to thereby wind said spring, and means for preventing the unwinding of said spring, except by the rotation of said shutter.

22. In a camera of the character described adapted for use with a strip of film, the combination of a casing, a shaft supported in said casing, a rotatable shutter mounted on said shaft, a windable spring for causing the rotation of said shutter in one direction only, a gear mounted on said shaft for rotation therewith, a stop arm fixed to said gear to limit the rotation thereof, one end of said spring being fixedly attached for integral movement with said shaft and the other end of said spring being fixed to said shutter, means for advancing the film, said film advancing means comprising a second gear meshing with said first gear to cause rotation of said shaft to thereby wind said spring, means for preventing the unwinding of said spring, except by the rotation of said shutter, a projection on said shutter, and a spring pressed pawl member mounted in said casing, a portion of said pawl member being normally disposed in the path of said shutter projection to resiliently cushion the stopping action of said shutter after an exposure has been made to thus prevent rebound of said shutter in a direction opposite to the direction of rotation of said shutter.

23. In a camera of the character described adapted for use with a strip of film, the combination of a casing, a shaft supported in said casing, a rotatable shutter mounted on said shaft, a windable spring for causing the rotation of said shutter in one direction only, a gear mounted on said shaft for rotation therewith, a stop arm fixed to said gear to limit the rotation thereof, one end of said spring being fixedly attached for integral movement with said shaft and the other end of said spring being fixed to said shutter, means for advancing the film, said film advancing means comprising a second gear meshing with said first gear to cause rotation of said shaft to thereby wind said spring, a stop disc having a slotted aperture and projection thereon, said stop disc being relatively rotatable with respect to said shutter, a pin projection on said shutter operating in said slotted aperture to limit the said relative rotational movement of the disc and shutter, and means for preventing the unwinding of said spring, except by the rotation of said shutter.

24. In a camera of the character described adapted for use with a strip of film, the combination of a casing, a shaft supported in said casing, a rotatable shutter mounted on said shaft, a windable spring for causing the rotation of said shutter in one direction only, a gear mounted on said shaft for rotation therewith, a stop arm fixed to said gear for rotation therewith, one end of said spring being fixedly attached for integral movement with said shaft and the other end of said spring being fixed to said shutter, means for advancing the film, said film advancing means comprising a second gear meshing with said first gear to cause rotation of said shaft to thereby wind said spring, a stop disc having a slotted aperture and projection thereon, said stop disc being relatively rotatable with respect to said shutter, a pin projection on said shutter operating in said slotted aperture to limit the said relative rotational movement of the disc and shutter, means for preventing the unwinding of said spring, except by the rotation of said shutter, a link pivotally mounted in said casing so as to be normally in abutting relationship with said shutter stop plate, said stop arm having a portion thereof adapted to contactively engage said stop disc projection to cause rotation of said stop disc within the limits of said pin and slot operation, and said link being so disposed as to be moved out of the path of the shutter stop plate by said stop arm during such last named limited relative movement.

25. In a camera of the character described adapted for use with a strip of film, the combination of a casing, a shaft supported in said casing, a rotatable shutter mounted on said shaft, a windable spring for causing the rotation of said shutter in one direction only, a gear mounted on said shaft for rotation therewith, one end of said spring being fixedly attached for integral movement with said shaft and the other end of said spring being fixed to said shutter, means for advancing the film, said film advancing means comprising a second gear meshing with said first gear to cause rotation of said shaft to thereby wind said spring, means for preventing the unwinding of said spring, except by the rotation of said shutter, means for holding the said shutter against rotation during the said spring winding operation, said last named means comprising a stop plate fixed to said shutter, said stop plate having a projecting portion, a release lever pivotally mounted in said casing, said release lever having a projection thereon, and resilient means for normally holding said release lever projection in contactive abutting relationship with said stop plate projection.

26. In a camera of the character described adapted for use with a strip of film, the combination of a casing, a shaft supported in said casing, a rotatable shutter mounted on said shaft, a windable spring for causing the rotation of said shutter in one direction only, a gear mounted on said shaft for rotation therewith, one end of said spring being fixedly attached for integral movement with said shaft and the other end of said spring being fixed to said shutter, means for advancing the film, said film advancing means comprising a second gear meshing with said first gear to cause rotation of said shaft to thereby wind said spring, means for preventing the unwinding of said spring except by the rotation of said shutter, means for holding the said shutter against rotation during the said spring winding operation, said last named means comprising a stop plate fixed to said shutter, said stop plate having a projecting portion, a release lever pivotally mounted in said casing, said release lever having a projection thereon, resilient means for normally holding said release lever projection in contactive abutting relationship with said stop plate projection, and means for rendering said shutter holding means ineffective to thereby cause an exposure, said last named means comprising a rocker arm rotatably mounted in said casing, one end of said rocker arm being provided with a portion projectingly received in a slot in said release lever, said rocker arm being so designed that rotational movement thereof in one direction will cause said release lever to pivotally move against the action of said resilient means, to thereby move said release lever projection out of the path of said stop plate projection.

27. In a camera of the character described adapted for use with a strip of film, the combination of a casing, a shaft supported in said casing, a rotatable shutter mounted on said shaft, a windable spring for causing the rotation of said shutter in one direction only, a gear mounted on said shaft for rotation therewith, one end of said spring being fixedly attached for integral movement with said shaft, and the other end of said spring being fixed to said shutter, means for advancing the film, said film advancing means comprising a second gear meshing with said first gear to cause rotation of said shaft to thereby wind said spring, means for preventing the unwinding of said spring, except by the rotation of said shutter, means for holding the said shutter against rotation during the said spring winding operation, said last named means comprising a stop plate fixed to said shutter, said stop plate having a projecting portion, a release lever pivotally mounted in said casing, said release lever having a projection thereon, resilient means for normally holding said release lever projection in contactive abutting relationship with said stop plate projection, means for rendering said shutter holding means ineffective to thereby cause an exposure, said last named means comprising a rocker arm rotatably mounted in said casing, one end of said rocker arm being provided with a portion projectingly received in a slot in said release lever, said rocker arm being so designed that rotational movement thereof in one direction will cause said release lever to pivotally move against the action of said resilient means, to thereby move said release lever projection out of the path of said stop plate projection, and a push button operable from outside of said casing to actuate said rocker arm.

GEORGE KENDE.
PHILIP J. BROWNSCOMBE.